Feb. 14, 1956   H. A. STRICKLAND, JR   2,734,600
SEALED BRAKE DRUM CLOSURE
Filed March 9, 1951   3 Sheets-Sheet 1
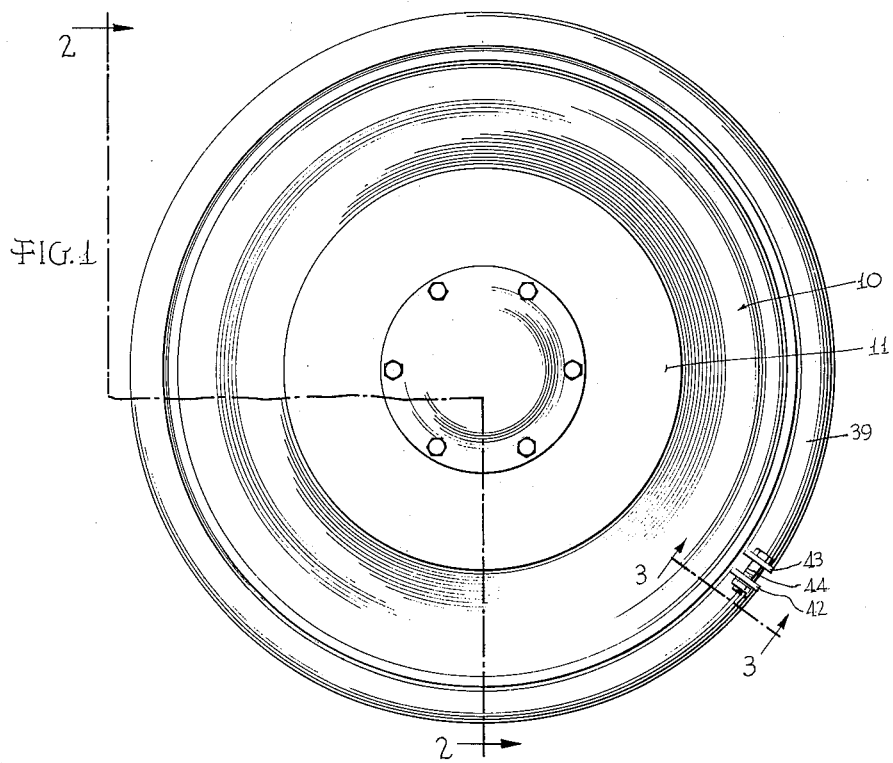
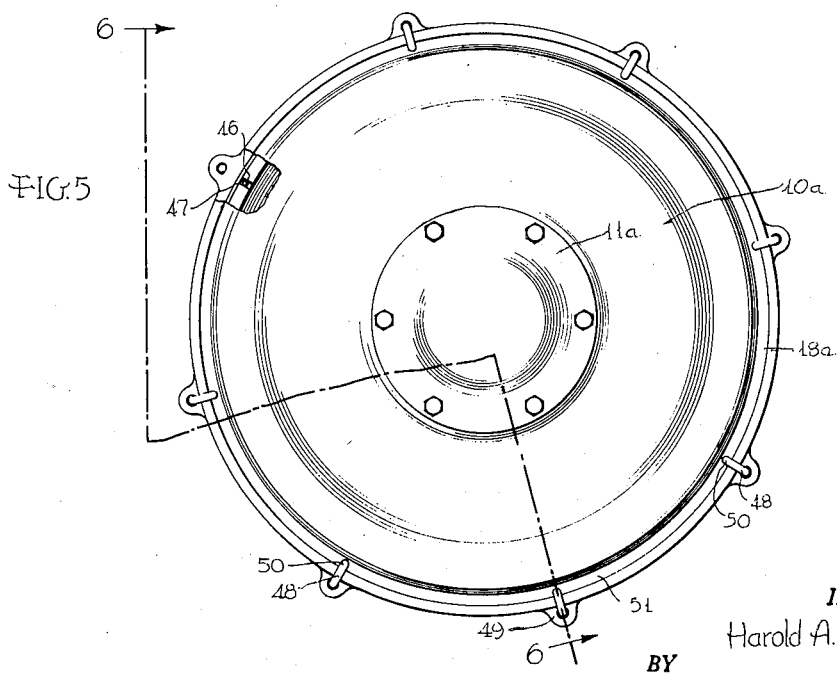
INVENTOR.
Harold A. Strickland, Jr.
BY
Maurice A. Crews
ATTORNEY

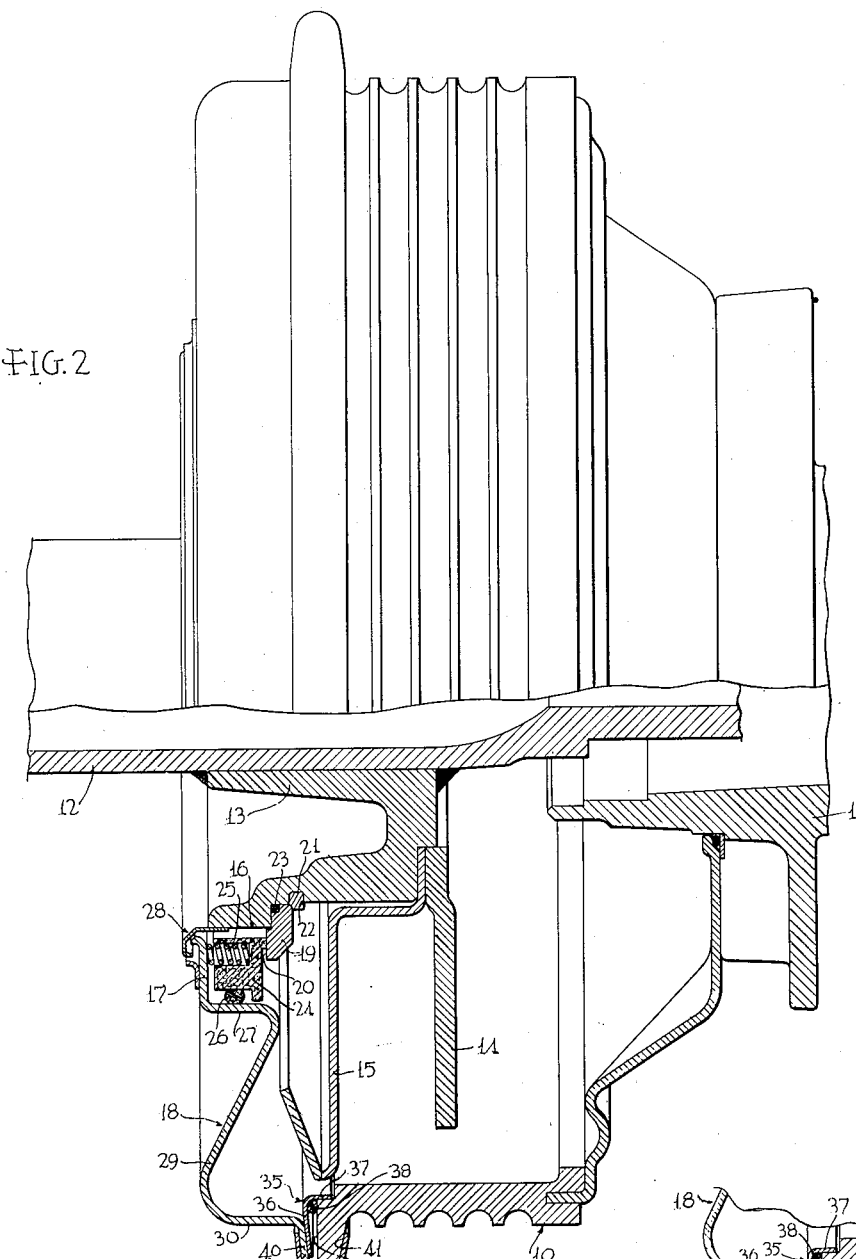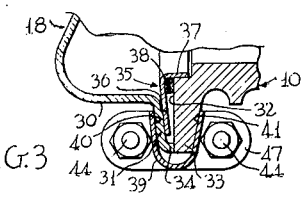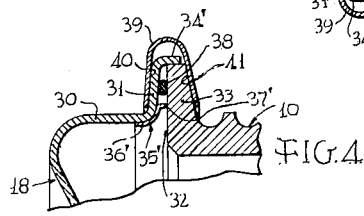

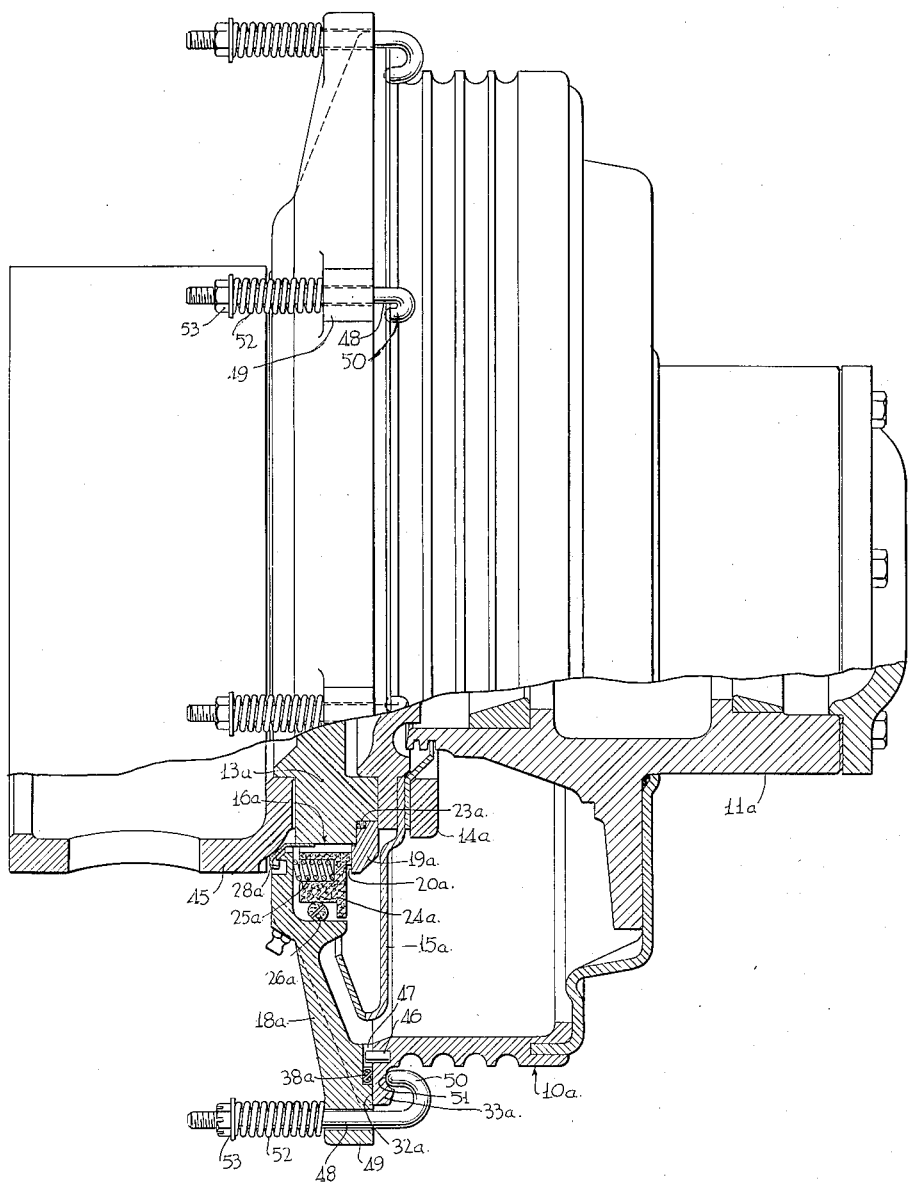

United States Patent Office 2,734,600
Patented Feb. 14, 1956

2,734,600

SEALED BRAKE DRUM CLOSURE

Harold A. Strickland, Jr., Glen Ellyn, Ill., assignor to The Budd Company, Philadelphia, Pa., a corporation of Pennsylvania Application March 9, 1951, Serial No. 214,764

6 Claims. (Cl. 188—218)

The invention relates to a closure for the open end of a brake drum and more particularly to sealing means for providing a fluid-tight seal between such closure and the drum.

It is among the objects of the invention to provide a readily applied seal between the peripheries of the drum and the closure, and to provide clamping means in association therewith which allows for the expansion or distortion of the drum under heat, maintaining at all times a fluid-tight seal between the closure and drum peripheries, and having readily applicable and removable means for clamping these peripheries together to compress a yielding sealing ring disposed between them.

These and other and further objects and advantages and the manner in which they are attained will become apparent from the following detailed description when read in connection with the drawings forming a part of this specification.

In the drawings:

Fig. 1 is an outside elevational view of a drum and associated parts, showing one form of closure attaching and sealing means applied thereto;

Fig. 2 is an enlarged sectional elevation of the drum and associated parts shown in Fig. 1, the section being taken substantially along the line 2—2 of Fig. 1;

Fig. 3 is a detail sectional view on the same scale as Fig. 2, the section being taken substantially along the line 3—3 of Fig. 1;

Fig. 4 is a view similar to Fig. 3, showing a slightly modified form;

Fig. 5 is a view similar to Fig. 1, of another modified form of the invention; and Fig. 6 is a sectional elevational view similar to Fig. 2, of this modification, the section being taken substantially along the line 6—6 of Fig. 5.

Referring to Figs. 1, 2, and 3, the invention is shown applied to a brake drum 10 associated in a usual manner with a non-steerable driven hub 11 mounted through anti-friction bearings (not shown) on a fixed axle housing 12.

Fixed, as by welding, to the axle housing 12, at a point axially inwardly of the hub 11 is an annular U-section support 13, which carries at its axially outer end parts 14 and 15 of the brake mechanism. At its axially inner end it provides an annular seat 16 with which the radially inner margin 17 of the disc-like annular brake drum closure 18 has a sealed rotary engagement. Since the invention is not concerned with the detailed form of this inner seal (any suitable known seal being usable), it will suffice to state that it is designed to form a fluid-tight seal between the seat 16 and the inner margin 17 of the closure, and may be comprised of a metal ring 19 having a smooth radial face 20, carried by the support 13 and secured in place by a clamping ring 21 sprung into a groove 22. An O-ring 23 of silicone rubber or the like seals the joint between ring 19 and support 13.

An annular sealing member 24 of suitable sealing composition is continuously pressed by springs, as 25, into tight wiping engagement with the radial surface 20, to form a seal between them. An O-ring 26, similar to 23, forms a seal between member 24 and an axially extending portion 27 of the closure 18. In addition, a labyrinth seal 28 may be provided between the inner margin of the closure and the support 13.

The closure 18, in this form of the invention, comprises a sheet metal stamping having an inclined portion 29 extending radially outwardly from the axially extending portion 27. The outer end of the inclined portion 34 merges with an axially extending portion 30 which in turn merges with a generally radially extending portion 31. The radially extending outer marginal portion 31 of the closure extends in overlapping relation to a flat radial face 32 formed on a flange 33 at the open end of the drum 10. The outer margin of the portion 31 is turned axially at 34 and rests against the flat radial face 32 of the drum flange 33, holding the part 31 spaced a slight distance from said face.

The portion 31 of the closure is extended radially inwardly by an angular section annulus 35 having one arm, as 36, secured as by welding to the part 31 and the other arm, as 37, forming a pilot to guide the cover in its assembly with the drum. With this arrangement, it will be seen that a radially elongated space is formed by the parts 31, 34, and 35 carried by the closure 18 and the radial face 32 on the drum flange 33. To form a fluid-tight seal between these parts, a sealing O-ring 38, similar to rings 23 and 26, is compressed in this space when the parts are clamped together in the manner now to be described.

A simple means to effect this clamping action comprises a thin more or less springy split annulus 39 of sheet metal, this annulus being of substantially V-cross-section and when clamped in place having its side walls in engagement with the inclined remote faces 40 and 41 of the closure portion 31 and the brake drum flange 33, respectively, and yieldingly, through the resilience of said side walls, pressing these parts together and compressing the sealing ring 38. The annulus 39 is clamped in place by drawing its ends, flanged as at 42, 43 together by bolts 44 passing through said flanges, see Figs. 1 and 3. In this way the tight seal between the periphery of the closure and the drum is readily effected, and the parts are easily assembled and disassembled. At the same time, the yielding nature of the clamping ring 39 allows expansion or distortion of the drum under the heat of braking without disturbing the seal and without placing any appreciable radial strain on the closure. The strong frictional engagement between the ring 39 and the drum flange 33 and closure part 31 provides an effective drive between the drum and the closure.

The alternative form shown in Fig. 4 differs from the form already described only in details. In this form like parts are designated by like reference numerals. Instead of having the inturned marginal flange a very short flange engaging the radial face 32 of the drum, in this form the corresponding flange 34' is lengthened and overlaps the radially outer face of the brake drum flange 33 and thus serves as a pivot in assembling the parts. The space for receiving the sealing ring 38 in this case is completed by an angular-section member 35' welded through one arm 36' to the closure 18 and having its other arm 37' engaging the face 32 of the drum.

The operation is the same as in the preferred form except that, in this case, the flexibility of the axially extending portion 30 of the closure 18 is relied upon to allow sufficient radial yielding to take care of drum expansion or distortion without disturbing the seal.

Referring now to the form shown in Figs. 5 and 6, the invention is there shown applied to a brake drum 10a associated in a usual manner with a steerable driven hub 11a. The inner annular seat as 16a is in this case formed on a support 13a carried by a usual steering spindle mounting, as 45.

The parts of the inner seal correspond to those of the preferred form and are similarly numbered, with the addition of the letter a to respective numbers.

The closure member 18a in this form is a casting made of a light metal, such as aluminum, and its outer periphery in this case has sliding engagement with the radial face 32a of the brake drum 10a. Within an annular recess in the flat face of the member 18a engaging the flat face 32a of the drum is arranged the sealing O-ring 38a, and when the parts are in the position shown, this ring is compressed to form a fluid-tight seal. To allow for the expansion of the drum while at the same time maintaining a driving engagement between the drum and the closure 18a, pins, as 46, on the brake drum 10a project into slots, as 47, on the closure 18a. A similar positive drive could be provided in the preferred form, if desired, in addition to the frictional drive provided by the clamping ring 39.

In this form of Figs. 5 and 6, in order to yieldingly clamp the parts together throughout substantially their entire circumference, an annular series of spring-pressed hooks, as 48, are provided. These hooks are loosely supported in radial ears 49 on the cover 18a and have hooked ends, as 50, which engage a recess or recesses, as 51, in the axially outer face of the brake drum flange 33a. Coil springs, as 52, reacting between the adjacent closure face and the nuts and washers 53 on the hooks 48, exert the clamping force which holds the adjacent faces of the closure 18a and the brake drum 10a in engagement and the sealing ring 38a under sealing pressure.

It will be seen that, in all forms of the invention shown, the outer peripheries of the brake drum and cover are readily assembled with the sealing ring in place between them, after which the clamping means, as split ring 39 or spring hooks 48, are readily secured in place to hold the sealing ring under sealing compression. At the same time, the yielding character of the clamping action allows the brake drum to expand or distort under heat without disturbing the seal and without placing undue radial stress on the cover.

While several preferred forms of the invention have been herein described in detail, it will be understood that changes and modifications may be made by those skilled in the art without departing from the spirit and scope of the claims appended hereto.

What is claimed is:

1. A sealed closure for the open end of a brake drum mounted to rotate concentrically relative to an annular fixed seat, comprising in combination with the brake drum having a radial end face, an annular closure member carried with and by the brake drum and having a sealed rotary joint with said annular fixed seat, said annular closure member having a radial end face opposed to the radial end face of the brake drum, annular sealing means between said opposed radial end faces of the drum and annular closure member, and means binding the end of the brake drum and annular closure member together and providing radial movement therebetween, the outer assembly thus provided forming a non-rotary but radially yieldable joint between the end of the brake drum and said annular closure member, said brake drum and annular closure member also being provided with other annular interengaging surfaces which form a radially adjustable annular seal supplemental to said annular sealing means.

2. A sealed closure for the open end of a brake drum mounted to rotate concentrically relative to an annular fixed seat, comprising in combination with the brake drum having a radial end face, an annular closure member carried with and by the brake drum and having a sealed rotary joint with said annular fixed seat, said annular closure member having a radial end face opposed to the radial end face of the brake drum, annular sealing means between said opposed radial end faces of the drum and annular closure member, and means binding the end of the brake drum and annular closure member together and providing radial movement therebetween, the outer assembly thus provided forming a non-rotary but radially yieldable joint between the end of the brake drum and said annular closure member, said annular closure member comprising a portion which is radially flexible to provide additional radial movement between the inner rotary sealing joint and the outer sealing joint.

3. A sealed closure for the open end of a brake drum mounted to rotate concentrically relative to an annular fixed seat, comprising in combination with the brake drum having a radial end face, an annular closure member carried with and by the brake drum and having a sealed rotary joint with said annular fixed seat, said annular closure member having a radial end face opposed to the radial end face of the brake drum, annular sealing means between said opposed radial end faces of the drum and annular closure member, and means binding the end of the brake drum and annular closure member together and providing radial movement therebetween, the outer assembly thus provided forming a non-rotary but radially yieldable joint between the end of the brake drum and said annular closure member, said brake drum and said annular closure member being provided with outwardly extending mating flange portions, and means for resiliently securing said flange portions together to provide relative radial movement therebetween and at the same time to exert axial pressure on said annular sealing means between the radial faces of the brake drum and the annular closure member.

4. A sealed closure for the open end of a brake drum mounted to rotate concentrically relative to an annular fixed seat, comprising in combination with the brake drum having a radial end face, an annular closure member carried with and by the brake drum and having a sealed rotary joint with said annular fixed seat, said annular closure member having a radial end face opposed to the radial end face of the brake drum, annular sealing means between said opposed radial end faces of the drum and annular closure member, and means binding the end of the brake drum and annular closure member together and providing radial movement therebetween, the outer assembly thus provided forming a non-rotary but radially yieldable joint between the end of the brake drum and said annular closure member, said brake drum and said annular closure member being provided with outwardly extending mating flange portions, and a circumferentially expansible and contractile band having interiorly convergent sides engaging said flange portions to bind them together.

5. A sealed closure for the open end of a brake drum mounted to rotate concentrically relative to an annular fixed seat, comprising in combination with the brake drum having a radial end face, an annular closure member carried with and by the brake drum and having a sealed rotary joint with said annular fixed seat, said annular closure member having a radial end face opposed to the radial end face of the brake drum, annular sealing means between said opposed radial end faces of the drum and annular closure member, and means binding the end of the brake drum and annular closure member together and providing radial movement therebetween, the outer assembly thus provided forming a non-rotary but radially yieldable joint between the end of the brake drum and said annular closure member, said brake drum and said annular closure member being provided with outwardly extending mating flange portions tapering outwardly toward each other on their outer surfaces, and a circumferentially extending transversely split expansible and contractile band having interiorly convergent sides engaging the tapered surfaces of said flange portions, together with means for drawing said band tight circumferentially on said flange portions.

6. A sealed closure for the open end of a brake drum mounted to rotate concentrically relative to an annular fixed seat, comprising in combination with the brake drum having a radial end face, an annular closure member carried with and by the brake drum and having a sealed rotary joint with said annular fixed seat, said annular closure member having a radial end face opposed to the radial end face of the brake drum, annular sealing means between said opposed radial end faces of the drum and annular closure member, and means binding the end of the brake drum and annular closure member together and providing radial movement therebetween, the outer assembly thus provided forming a non-rotary but radially yieldable joint between the end of the brake drum and said annular closure member, said annular sealing means comprising a resilient O-ring arranged to provide radial yielding movement by rolling on the axis of its annular cross section.

References Cited in the file of this patent

UNITED STATES PATENTS

| | | |
|---|---|---|
| 1,903,935 | Nichols | Apr. 18, 1933 |
| 2,013,945 | Bobbitt | Sept. 10, 1935 |
| 2,131,614 | Chase | Sept. 27, 1938 |

FOREIGN PATENTS

| | | |
|---|---|---|
| 48,670 | France | Feb. 8, 1938 |
| | (1st Addition to No. 731,041) | |